United States Patent
Watanabe (10) Patent No.: US 6,540,543 B1
(45) Date of Patent: Apr. 1, 2003

(54) ELECTRICAL CONNECTION BOX

(75) Inventor: Tomotaka Watanabe, Tokyo (JP)

(73) Assignee: Furakawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/237,932

(22) Filed: Jan. 27, 1999

(30) Foreign Application Priority Data

Jan. 28, 1998 (JP) ............................................. 10-015213

(51) Int. Cl.[7] .............................................. H01R 13/625
(52) U.S. Cl. ........................ 439/354; 439/76.2; 439/521
(58) Field of Search ................................ 439/350, 352, 439/354, 357, 76.2, 78, 81, 544, 521, 271, 587

(56) References Cited

U.S. PATENT DOCUMENTS

| 4,869,675 A | * | 9/1989 | Ogawa | 439/76.2 |
| 6,045,412 A | * | 4/2000 | Guanco et al. | 439/752 |

FOREIGN PATENT DOCUMENTS

| DE | 123 8534 | * | 4/1967 | 439/350 |
| DE | 33 13284 | * | 10/1984 | 439/350 |
| JP | 7-39226 | | 7/1995 | |
| JP | 739226 | * | 7/1995 | 439/76.2 |
| JP | 9-79221 | * | 3/1997 | 439/76.2 |
| JP | 9-151916 | | 6/1997 | |
| JP | 9151916 | * | 6/1997 | 439/76.2 |

* cited by examiner

*Primary Examiner*—Hien Vu
(74) *Attorney, Agent, or Firm*—Jacobson Holman PLLC (57) ABSTRACT

An electrical connection box has a casing 1 and a cover 2, which can be securely assembled, regardless of whether a packing is to be interposed therebetween. A female locking element 10 having a hook-shaped locking pawl 13 is formed on an outside surface of a side wall 1b of the casing. The cover is formed with a flexible male locking element 20, which is V-shaped in its cross-section and which is to be inserted into the female element. The male locking element is provided with locking holes 24a, 24b spaced a distance corresponding to the thickness of a watertight packing 3, and the locking pawl can be inserted into either of the locking holes.

3 Claims, 6 Drawing Sheets

ELECTRICAL CONNECTION BOX

FIELD OF THE INVENTION

The present invention relates generally to an electrical connection box having a casing and a cover engageable with the casing which are interlocked with each other, and more particularly, to such an electrical connection box disposed in a wiring connection, junction or branch area of wire harness or the like in connection with various kinds of electrical devices or equipments in a vehicle or the like so that the cover and the casing can be assembled together, regardless of whether a watertight packing is interposed therebetween.

BACKGROUND OF THE INVENTION

An electrical connection box has been employed in variety of electric wiring or circuits in order to connect or branch wire harness or the like which leads to various kinds of electric equipments in an automobile vehicle or the like. Such an electrical connection box is exemplified in FIG. 3, which is of a rectangular profile. This kind of connection box comprises an assembly of a lower casing 1 and an upper cover 2, which are produced by injection molding processes of resin, such as polypropylene, nylon or polybutyl terephthalate, with use of a metal mold.

Figure 3:
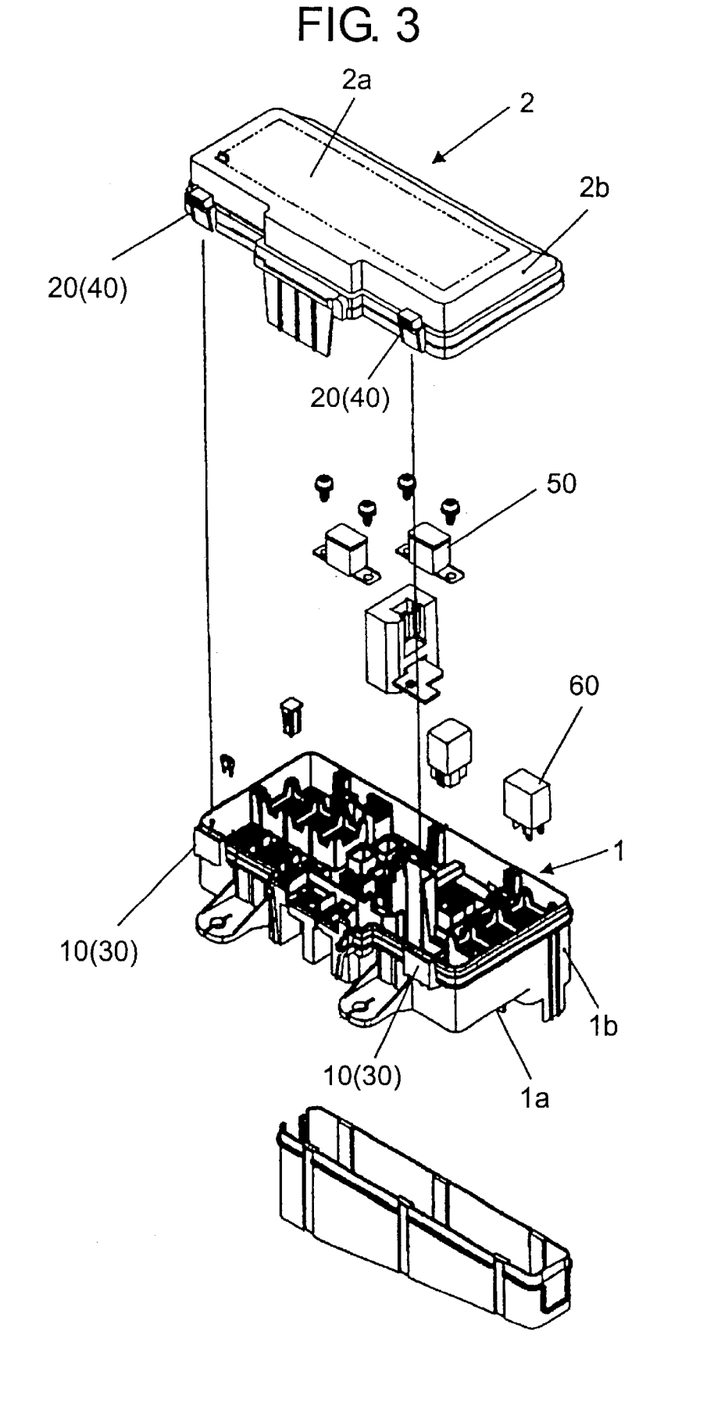
FIG. 3 is a perspective view of the electrical connection box in its disassembled state.

The casing 1 has a side wall or plate 1b on a peripheral zone of a bottom wall 1a, whereas the cover 2 has a side wall or plate 2b on a peripheral zone of a top wall 2a. Female locking elements 10 in a pair are provided on the side wall 1b of the casing 1 and male locking elements 20 engageable with the female locking elements 10 are provided on the side wall 2b of the cover 2. The female and male locking elements 10, 20 are interlocked with each other, so that the casing 1 and the cover 2 are integrally assembled in an interlocking position so as to define an enclosure of electric devices, such as fuses 50 or relays 60.

Referring to FIG. 4, a structure of the female and male locking elements 10, 20 are illustrated as an example. The female locking element 10 is provided on an upper outside surface of the side wall 1b of the casing 1, which element 10 comprises a bottom wall 11 and a side wall 12 generally formed in a L-shaped cross-section. A base end of the bottom wall 11 is secured to the side wall 1b, and a hook-shaped locking pawl 13 is disposed to protrude inwardly at an upper end of the side wall 12.

The male locking element 20 is formed on a lower outside surface of the side wall 2b of the cover 2, the element 20 comprising a flexible part 21 in a form of the letter "V" in its cross-section so as to be insertable into the female locking element 10, and a joint portion 22 integrally extending to a base end of the flexible part 21 and supported by the side wall 2b of the cover 2. The flexible part 21 is provided at its outside end portion with a pressed or pinched part 23 used for deflecting or deforming the flexible part 21. A locking hole 24 is formed in a position of the flexible part 21 adjacent to the pressed part 23 so as to receive the locking pawl 13 of the female locking element 10.

Figure 4A:
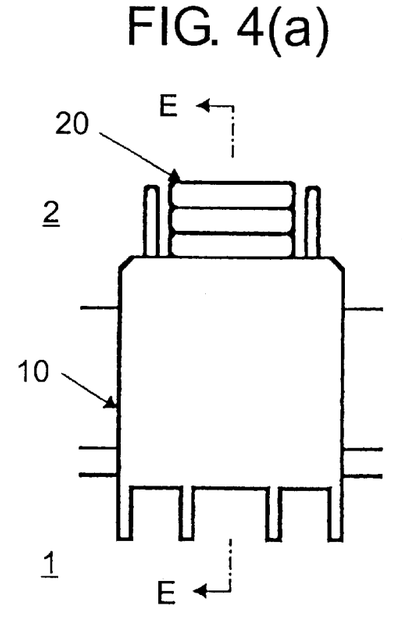
FIG. 4(a) shows a front elevation in a condition that a packing is not used.
Figure 4B:
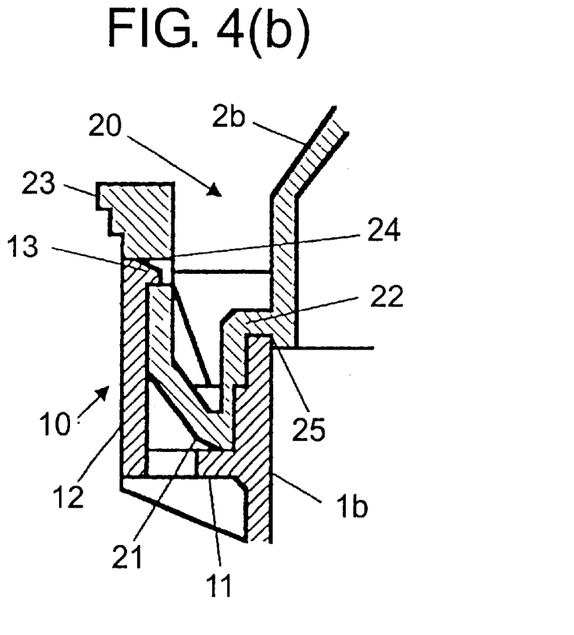
FIG. 4(b) shows a cross-section taken along line E—E of FIG. 4(a)
Figure 4C:
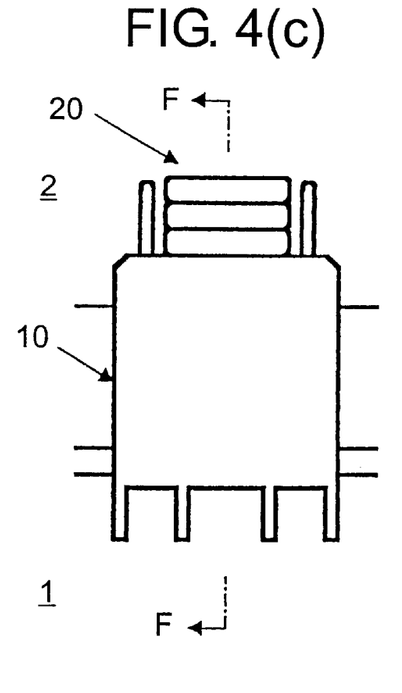
FIG. 4(c) shows a front elevation with a packing used therefor.
Figure 4D:
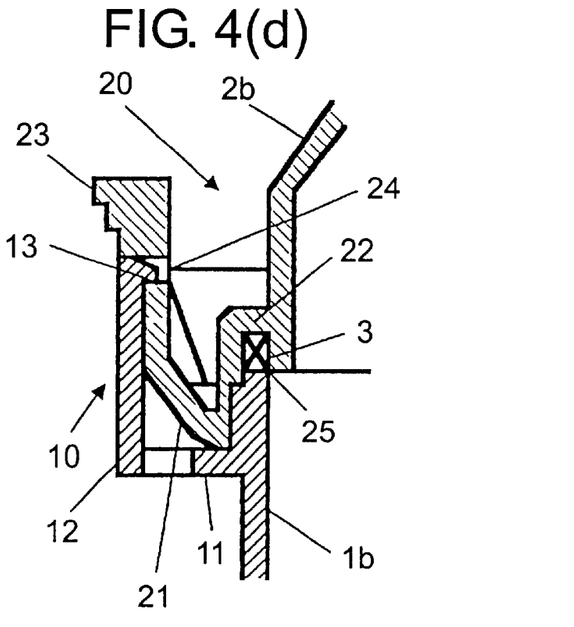
FIG. 4(d) shows a cross-section taken along line F—F of FIG. 4(c)

The joint portion 22 is provided with a recess or groove 25 between the cover 2 and the base end of the flexible part 21, which recess has a width corresponding to a thickness of the side wall 1b of the casing 1. If the electrical connection box is to be used in an engine room or the like into which water or moisture may leak, waterproofness of the connection box is required, and therefore, the recess 25 is formed to have a substantial depth for containing a watertight packing 3 therein, as shown in FIGS. 4(c), (d). If such waterproofness is not required, the recess 25 is formed to have a relatively small dimension in depth so as to be merely engaged with the end edge of the casing 1, as shown in FIGS. 4(a), (b). Thus, different combinations of the casings and covers have to be prepared in accordance with their condition in use, i.e., in response to provision or omission of the packing 3.

In use of such a conventional connection box, the cover 2 with the male locking element 20 is placed on the casing 1 with the female locking element 10, so that the flexible part 21 is inserted into the female locking element 10 as the part 21 being deformed inwardly. At the time when the joint portion 22 or the packing 3 bears against the upper end edge of the side wall 1b of the casing 1, the locking pawl 13 of the female locking element 10 is inserted into the locking hole 24 of the male locking element 20, whereby the casing 1 and the cover 2 are integrally assembled in an interlocking position. If the cover 2 is to be disassembled from the casing 1, the pressed part 23 of the male locking element 20 is pressed inwardly to disengage the locking pawl 13 from the locking hole 24, so that the interlocking action of the casing 1 and the cover 2 is relieved.

With reference to FIG. 5, another structure of the female and male locking elements 30, 40 are exemplified. The female locking element 30 in a form of letter "C" or rectangular frame is provided on an outside surface of the side wall 1b of the casing 1 at a position slightly lower than the upper edge thereof, an inner surface of the element 30 being provided with a hook-shaped locking pawl 31 opposing to the outside surface of the side wall 1b.

The male locking element 40 is formed on a lower outside surface of the side wall 2b of the cover 2, which element 40 comprises a flexible part 41 profiled in a form of upset "U" in its transverse cross-section to be inserted into the female locking element 30, and a joint portion 42 integrally extending from a bent portion of the flexible part 41 and supported by the side wall 2b of the cover 2. The flexible part 41 is provided at its outside end portion with a hook-shaped locking pawl 43 outwardly extending to be engaged with the locking pawl 31.

Figure 5A:
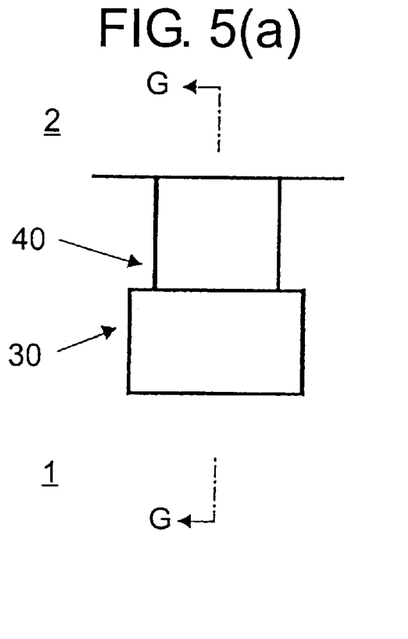
FIG. 5(a) shows a front elevation in a condition that a packing is not used.
Figure 5B:
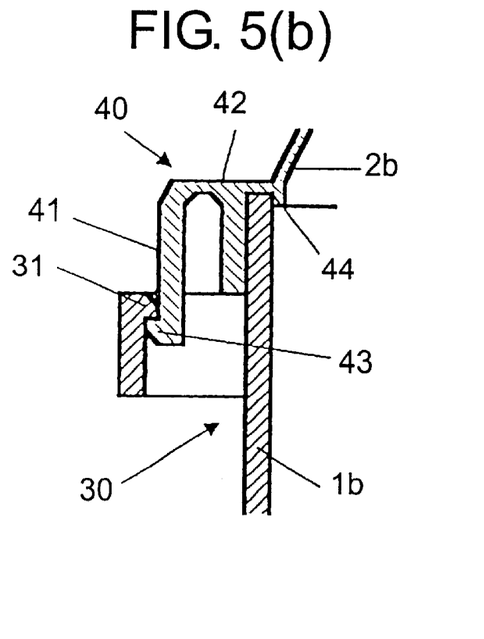
FIG. 5(b) shows a cross-section taken along line G—G of FIG. 5(a)
Figure 5C:
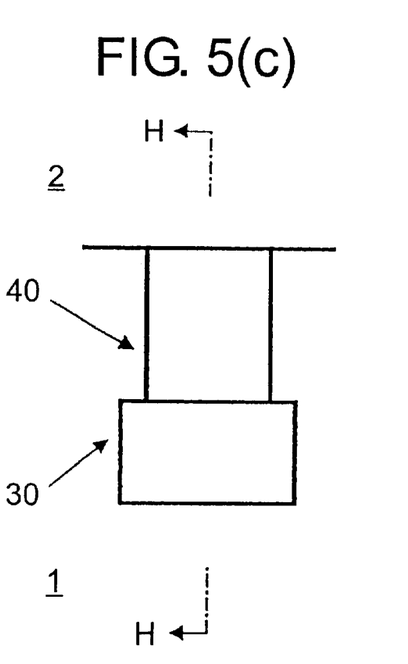
FIG. 5(c) shows a front elevation with a packing used therefor.
Figure 5D:
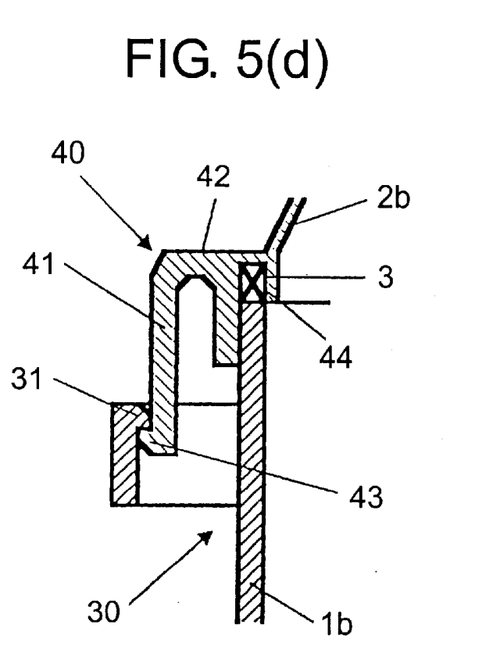
FIG. 5(d) shows a cross-section taken along line H—H of FIG. 5(c).
Figure 6A:
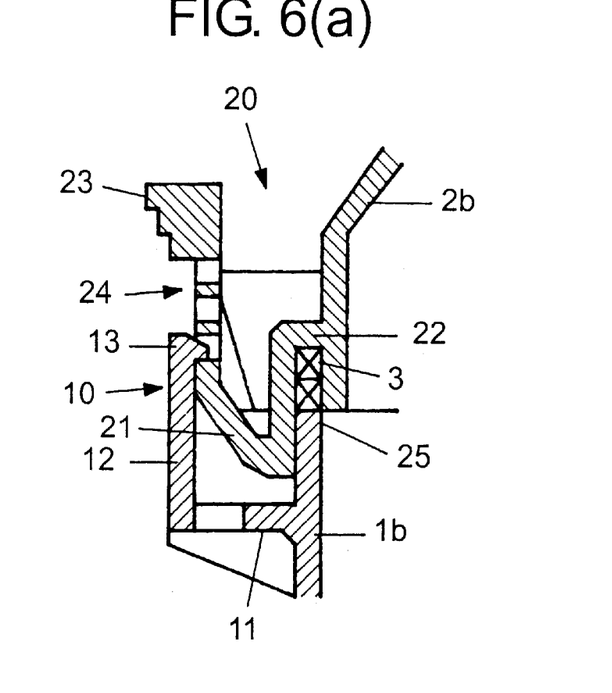
FIG. 6(a) shows a cross-section of a second embodiment of the present invention similar to FIG. (d) with these locking holes.
Figure 6B:
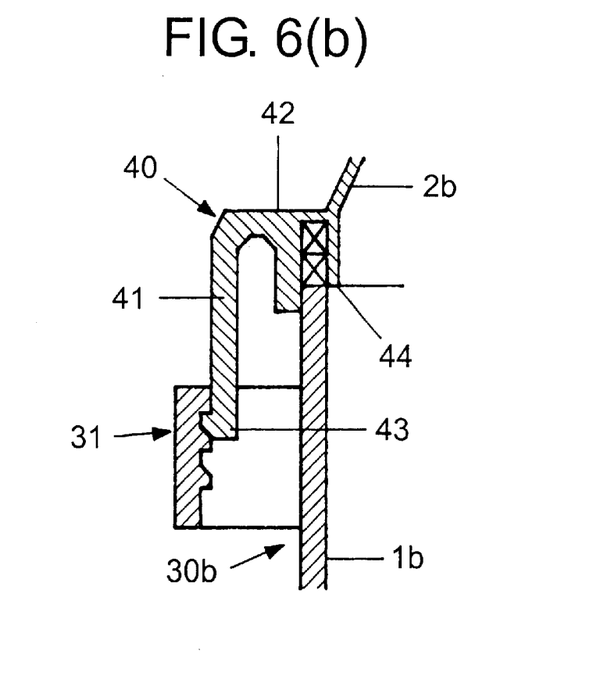
FIG. 6(b) shows a cross-section of a second embodiment of the present invention similar to FIG. 2(d) with three pawls.

The joint portion 42 is provided with a recess or groove 44 between the cover 2 and the base end of the flexible part 41, which has a width corresponding to a thickness of the side wall 1b. If the electrical connection box is to be used in an engine room or the like into which water or moisture may leak, waterproofness of the connection box is required, and therefore, the recess 44 is formed to have a substantial depth for containing a watertight packing 3 therein, as shown in FIGS. 5(c), (d). If such waterproofness is not required, the recess 44 is formed to have a relatively small dimension in depth so as to be merely engaged with an end edge of the casing 1, as shown in FIGS. 5(a), (b). As is similar to the aforementioned type of structure, a particular structure of the casing 1 and cover 2 be predetermined in each of the conditions in use, which depends on provision of the packing 3.

In use of this connection box, the cover 2 with the male locking element 40 is placed on the casing 1 with the female locking element 30, and the joint portion 42 or the packing 3 abuts against the upper end edge of the side wall 1b. Simultaneously with the abutment, the locking pawls 43, 31a re engaged or latched with each other, so that the casing 1 and the cover 2 are integrally assembled in an interlocking position. When the cover 2 is disassembled from the casing 1, the outside of the male locking element 40 is urged inwardly until the locking pawl 43 can be disengaged from the locking pawl 31, thereby releasing the interlocking action therebetween.

Arrangements of those kinds of electrical connection boxes are disclosed in Japanese Patent Laid-Open Publication No.9-79221 or Japanese Utility-Model Laid Open Publication No.7-39226, in which a casing and a cover are securely interlocked without loose conditions occurring. Further, another type of electrical connection box is disclosed in Japanese Patent Laid-Open Publication No.9-151916 in which a cover is adapted to be engaged with a casing selectively in two levels without mismatching them in inappropriate interlocking positions.

In those conventional connection boxes, the specific locking pawl 13 is inserted into the counterpart locking hole 24; or otherwise, the specific locking pawl 31 is engaged with its counterpart locking pawl 43, whereby the cover 2 and the casing 1 can be integrally assembled in a desired interlocking position. It follows that the different casings 1 and/or covers 2 have to be prepared in accordance with the requirement or necessity of using the packing 3.

This, however, results in fabrication or modification of at least two types of metal molds for producing such different casings 1 and/or covers 2 in response to installation or elimination of the packing, since the casings 1 and covers 2 are produced by injection molding processes of resin with use of the metal molds. Such preparation of different types of molds and processes leads to an undesired increase of manufacturing costs for the connection boxes.

Although the electrical connection boxes are disclosed in Japanese Patent Laid-Open Publications Nos. 9-79221 and 9-151916 and Japanese Utility- Model Laid-Open Publication No. 7-39226, those publications do not disclose nor suggest any arrangement for assembling the casing and the cover in both of a condition in use of a packing and an unused condition thereof.

SUMMARY OF THE INVENTION

It is an object of the present invention to provide an electrical connection box, a casing and cover of which can be securely assembled, regardless of whether a packing is to be interposed therebetween.

The present invention provides an electrical connection box having a casing and a cover to be placed on the casing so as to allow the casing and the cover to be engaged with each other in an interlocking position, wherein one of the casing and the cover is provided with a locking pawl and the other thereof is provided with a first locking hole or pawl and a second locking hole or pawl; and wherein said first locking hole or pawl is adapted to be engaged with said locking pawl when a packing is interposed between said casing and said cover, and said second locking hole or pawl is adapted to be engaged with said locking pawl when the packing is not interposed between said casing and said cover.

From another aspect of the invention, the present invention provides an electrical connection box having a casing and a cover to be placed on the casing so as to allow the casing and the cover to be engaged with each other in an interlocking position, wherein one of the casing and the cover is provided with a locking hole and the other of said casing and said cover is provided with a first locking pawl and second locking pawl; and wherein said first locking pawl is adapted to be engaged with said locking hole when a packing is interposed between said casing and said cover, and said second locking pawl is adapted to be engaged with said locking hole when the packing is not interposed between said casing and said cover.

Preferably, the cover may be formed with a recess or groove which can be equipped with the packing therein and which is also adapted to be directly fit to a side wall of the casing in a case where the packing is not interposed between the casing and the cover.

According to the electrical connection box of the present invention, the casing and the cover can be integrally assembled in interlocking positions, regardless of whether the packing is provided therebetween.

BRIEF DESCRIPTION OF THE DRAWING

FIGS. 1(a)–1(d) include front elevational views and cross-sectional views illustrating the constituents in a first embodiment of the electrical connection box according to the present invention, wherein

FIGS. 2(a)–2(d) include front elevational views and cross-sectional views illustrating the constituents in a second embodiment of the present invention, wherein

FIGS. 4(a)–4(d) include front elevational views and cross-sectional views illustrating the constituents of a conventional electrical connection box, wherein FIGS. 5(a)–(d) include front elevational views and cross-sectional views illustrating the constituents of an electrical connection box of a conventional type which differs from the type as shown in FIG. 4, wherein

DESCRIPTION OF THE PREFERRED EMBODIMENT

Referring now to FIGS. 1(a)–1(d) there is depicted a first embodiment of the electrical connection box according to the present invention. In FIGS. 1(a)–1(d) elements or constituents substantially the same as those of the above-described conventional connection box are indicated by the same reference numerals as in FIGS. 4(a)–4(d) and FIGS. 5(a)–5(d)

As shown in FIGS. 1(a)–1(d), the first embodiment of the electrical connection box comprises a casing 1 having an electric circuit of a bus bar, electric wire or the like (not shown) contained therein, and electric equipments installed thereon, such as fuses 50 and relays 60, as shown in FIGS. 3(a)–3(d). A female locking element 10 is provided on an upper portion of a side wall or plate 1b of the casing 1 and a male locking element 20 is provided on a lower portion of a side wall or plate 2b of a cover 2. The female locking element 10, which is positioned on an upper outside surface of the side wall 1b of the casing 1, comprises a bottom wall 11 and a side wall 12 which are arranged in a configuration of the letter "L" in its cross-section. A base end of the bottom wall 11 is fixed on the side wall 1b, and a locking pawl 13 in a form of hook is provided at a distal end of the side wall 12 so as to be inwardly projected.

The male locking element 20 is positioned on a lower outside surface of the side wall 2b of the cover 2, and comprises a V-shaped flexible part 21 to be inserted into the female locking element 10 and a joint portion 22 connecting a base end of the flexible part 21 to the side wall 2b. The flexible part 21 is formed at its outside end portion with a pressed portion 23 for elastically deforming the flexible part 21, and two locking holes 24a, 24b for receiving the locking pawl 13 of the female locking element 10 are provided in the flexible part 21 adjacent to the pressed portion 23, the holes 24a,24b being spaced apart from each other in a depthwise direction of the side wall 1b. The spaced distance of these two holes 24a, 24b is set to be substantially the same as the thickness (height) of a packing 3. The locking holes 24a, 24b thus formed allow the cover 2 to be assembled onto the casing 1, regardless of whether the packing 3 is installed therebetween.

The joint portion 22 is formed with a groove or recess 25 between the side wall 2b of the cover 2 and the base end of the flexible part 21, the recess 25 having the width corresponding to the thickness of the side wall 1b of the casing 1. In a case where the electrical connection box ensures waterproofness, the packing 3 is fit into recess 25 as shown in FIGS. 1(c), (d). On the other hand, if it is not necessary to ensure the waterproofness of the connection box, the packing 3 is not fit in the recess 25. Therefore, the depth of the recess 25 is set to be a dimension in which a lower edge of the side wall 2b of the cover 2 can be engaged with a upper end edge of the side wall 1b of the casing 1 even with the packing 3 being fit in the recess 25. With reference to FIGS. 1(c), (d), a manner of engagement of the casing 1 and cover 2, while the waterproofing packing 3 being fit in the recess 25, will be described hereinafter. When the cover 2 is placed on the casing 1, the flexible part 21 of the male locking element 20 is inserted into the female locking element 10 as the outside wall of the flexible part 21 is deformed. At the time when the packing 3 of the male locking element 20 abuts against the end edge of the side wall 1b of the casing 1, the locking pawl 13 of the female locking element 10 is inserted into the lower locking hole 24a of the male locking element 20, so that the casing 1 and the cover 2 are integrally interlocked.

Figure 1A:
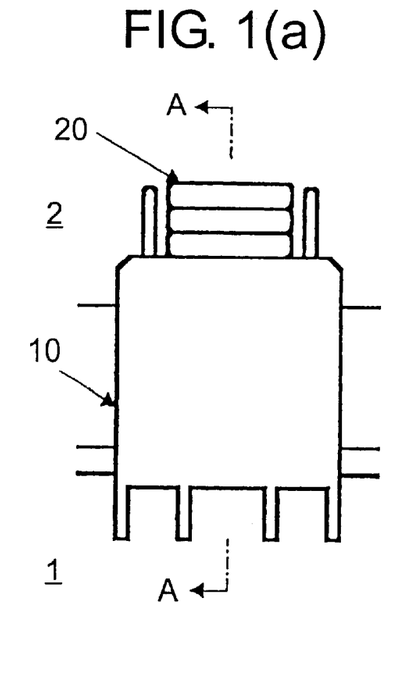
FIG. 1(a) shows a front elevation in a condition that a packing is not used.
Figure 1B:
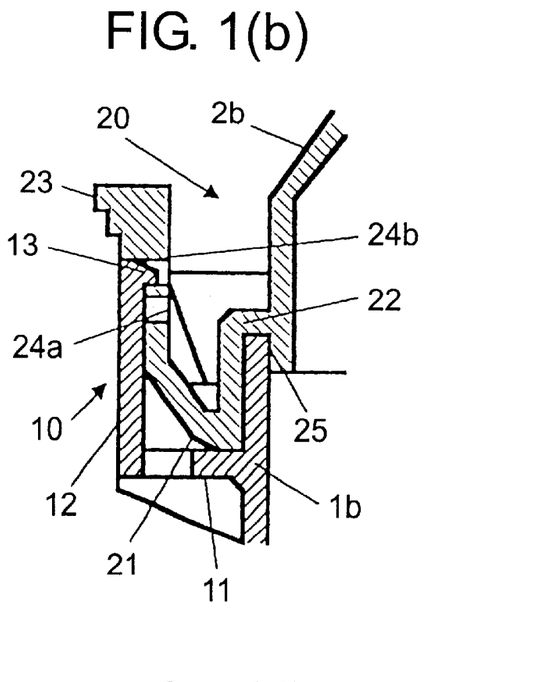
FIG. 1(b) shows a cross-section taken along line A—A of FIG. 1(a)
Figure 1C:
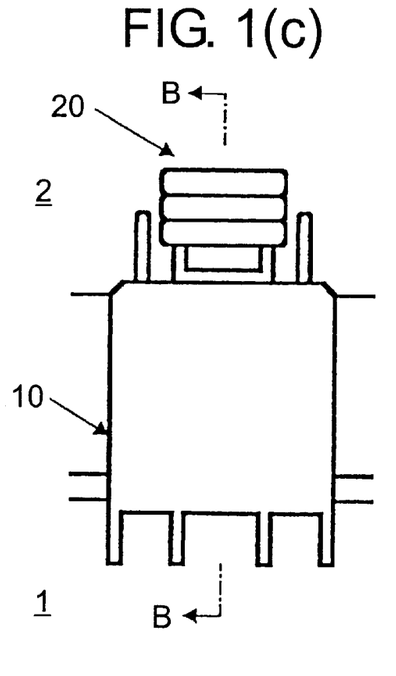
FIG. 1(c) shows a front elevation in a condition that a packing is used therefor.
Figure 1D:
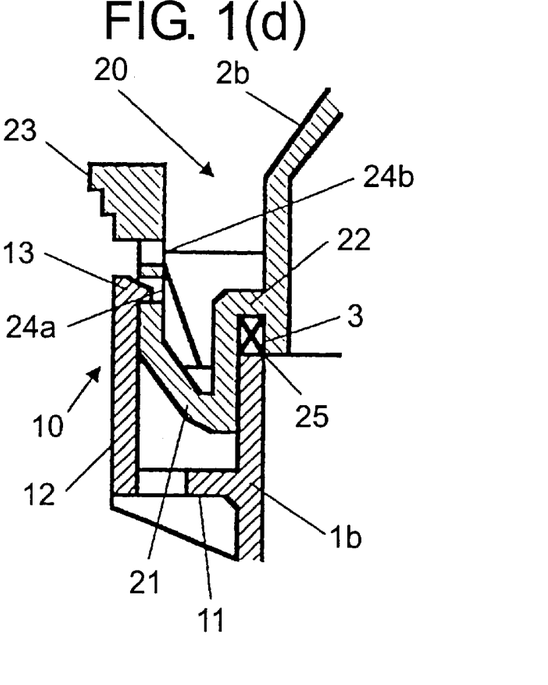
FIG. 1(d) shows a cross-section taken along line B—B of FIG. 1(c)

With reference to FIGS. 1(a), (b), a manner of engagement of the casing 1 and the cover 2 without the waterproofing packing 3 in the recess 25 will be described hereinafter. When the cover 2 is placed on the casing 1, the outside wall of the flexible part 21 of the male locking element 20 is deflected until the flexible part 21 is at least partially inserted into the female element 10. The flexible part 21 is further inserted into the female locking element 10 while the pressed part 23 is pressed or biased, so that the recess 25 of the male locking element 20 is fit onto the end edge of the side wall 1b of the casing 1. At the time of fitting the recess 25 thereon, the locking pawl 13 of the female locking element 10 is inserted into the upper locking hole 24b of the male locking element 20, whereby the casing 1 and the cover 2 are integrally interlocked.

Thus, the male locking element 20 is provided with the two locking holes 24a, 24b spaced a distance corresponding to the thickness of the packing 3, so that the casing 1 and the cover 2 can be integrally assembled in one of interlocking positions, regardless of whether the packing 3 is interposed therebetween. When the casing 1 and the cover 2 are to be disassembled from each other, the pressed portion 23 is pressed to disengage the locking pawl 13 from the locking hole 24a, 24b, whereby such an interlocking action can be released.

Referring to FIGS. 2(a)–(d), there is depicted a second embodiment of the electrical connection box according to the present invention.

The second embodiment of the electrical connection box according to the present invention has an arrangement similar to the aforementioned first embodiment, wherein a female locking element 30 is provided on an upper portion of the side wall 1b of the casing 1 and wherein a male locking element 40 is provided on a lower portion of the side wall 2b of the cover 2. However, this embodiment differs from the first embodiment in that the female locking element 30 is located in a slightly lower position below an upper edge of the side wall 1b of the casing 1, the element 30 being formed on the outside surface of side wall 1b in a rectangular hollow formation as seen from its upper side; and that two locking pawls 31a, 31b in a form of hook are provided on an inner surface of an outside wall of the female locking element 30, the pawls 31a, 31b opposing against the side wall 1b of the casing 1. These two locking pawls 31a, 31b are vertically spaced from each other a distance corresponding to the thickness (height) of the packing 3. The provision of such pawls 31a, 31b allows the cover 2 to be assembled to the casing 1, regardless of whether the packing 3 is used.

The side wall 2b of the cover 2 is provided at its lower end portion with the male locking element 40, which includes a flexible part 41 having a cross-section in a form of the upset letter "U" extending outward from the side wall 2b, and a joint portion 42 extending between the side wall 2b of the cover 2 and a bent portion of the flexible part 41. The flexible part 41 is formed at its outside lower end portion with a hook-shaped locking pawl 43 engageable with the locking pawls 31a, 31b of the female locking element 30, the pawl 43 extending outwardly from the flexible part 41. Further, a recess 44 is formed in the joint portion 42 between the side wall 2b of the cover 2 and a base end of the flexible part 41, the recess 44 having a width corresponding to the thickness of the side wall 1b of the casing 1. The packing 3 can be fit into the recess 44 if the packing 3 is required to ensure waterproofness.

An interlocking action of the casing 1 and the cover 2 with the waterproofing packing 3 fit in the recess 44 will be described hereinbelow with reference to FIGS. 2(c), (d). The cover 2 is placed on the casing 1 so that the flexible part 41 of the male locking element 40 is inserted into the female element 30 while the flexible part 41 is deformed inwardly. At the time of impingement or abutment of the packing 3 against an upper end edge of the side wall 1b of the casing 1, the locking pawl 43 of the male locking element 40 is brought into engagement with the upper locking pawl 31a, whereby the casing 1 and the cover 2 are integrally assembled with each other in an interlocking position as shown in FIGS. 2(c), (d).

Figure 2A:
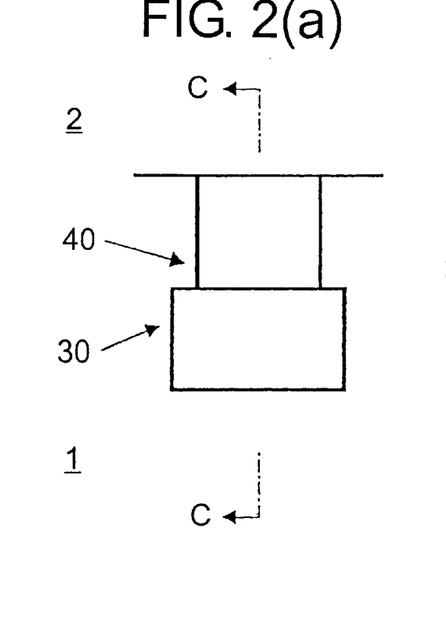
FIG. 2(a) shows a front elevation in a condition that a packing is not used.
Figure 2B:
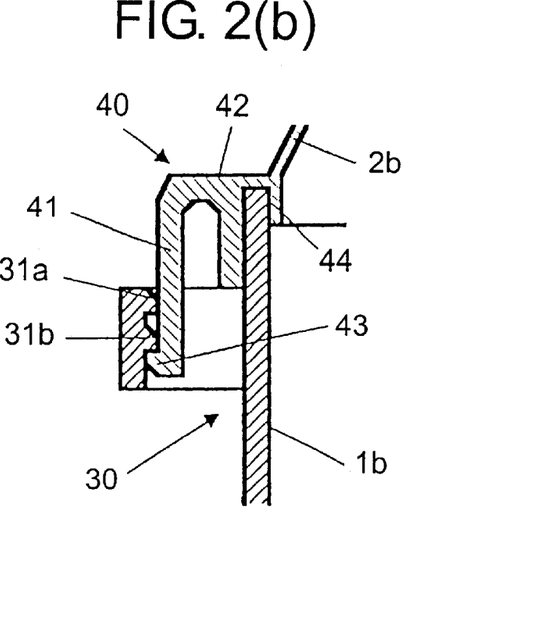
FIG. 2(b) shows a cross-section taken along line C—C of FIG. 2(a)
Figure 2C:
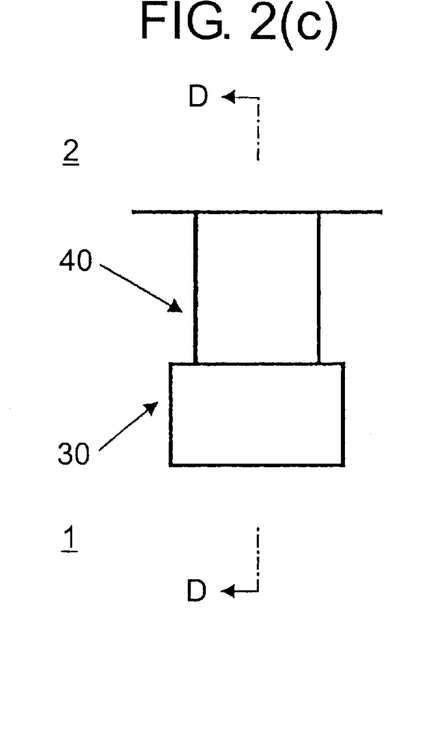
FIG. 2(c) shows a front elevation in a condition that a packing is used therefor.
Figure 2D:
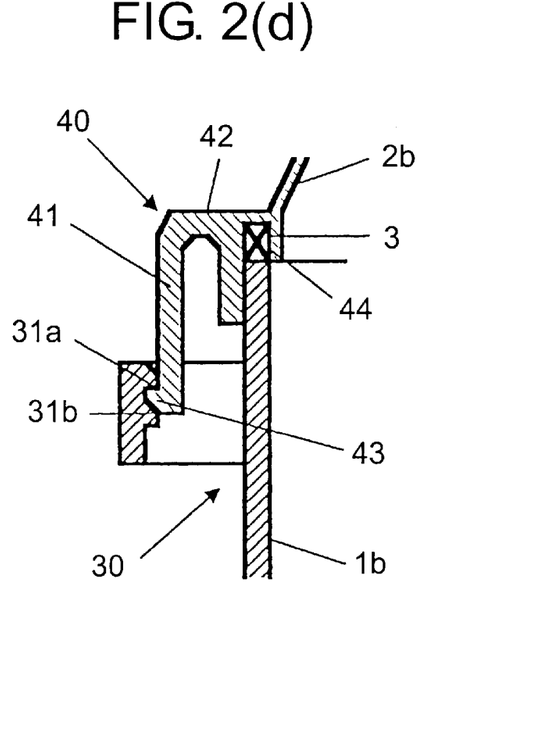
FIG. 2(d) shows a cross-section taken along line D—D of FIG. 2(c)

On the contrary, FIGS. 2(a), (b) shows another interlocking position of the casing 1 and the cover 2 in a case where the packing 3 is not fit in the recess 44 as waterproofness is not required. When the casing 1 is covered with the cover 2, the flexible part 41 of the male locking element 40 is inserted into the female locking element 30 by an inward deflection of the flexible part 41. The joint portion 42 of the male locking element 40 abuts against the upper end edge of the side wall 1b of the casing 1, and simultaneously therewith, the locking pawl 43 of the male locking element 40 engages with the lower locking pawl 31b of the female locking element 30 so that the casing 1 and cover 2 are integrally interlocked with each other.

Thus, the female locking element 30 is provided with the locking pawls 31a, 31b having the spaced distance therebetween substantially equal to the thickness of the packing 3, and therefore, the casing 1 and the cover 2 can be integrally assembled, regardless of whether the packing 3 needs to be provided therefor. Further, the interlocking of the locking pawls 31a, 31b, 43 can be released by pressing the outside surface of the flexible part 41 of the male locking element 40, if disassembling of the casing 1 and the cover 2 is desired.

As a further alternative embodiment, the arrangement may be adopted in that one of the casing 1 and the cover 2 is formed with locking holes, and another thereof is provided with first and second locking pawls in such a manner that the first locking pawl can be engaged with the locking hole when a packing is interposed between the casing 1 and the cover 2, and that the second locking pawl can be engaged with the locking hole when no packing is interposed therebetween.

It will be appreciated that, although specific embodiments of the present invention have been described herein for purposes of illustration, various modifications may be made without departing the spirit and scope of the invention.

For example, the number of the locking pawls or locking holes is not limited to be two, but three or more locking pawls or holes may be provided so as to be applicable to a connection box which may be provided with a plurality of packing 3 having various thicknesses selectively used.

Further, the packing 3 is not limited to be of a waterproofness type, but it may be of a dustproofness type.

What is claimed is:

1. An electrical connection box capable of being sealed through the use of an elongated watertight packing of a predefined thickness, the electrical connection box comprising:
   (a) a casing having a casing sidewall of a predetermined thickness with the sidewall terminating in an end edge;
   (b) a cover including a cover sidewall for placing on the casing, the cover having a recess about the periphery of the casing, the recess having a width corresponding to the thickness of the end edge of the casing side wall, the casing and cover normally being engaged and locked with each other so that the end edge of the sidewall fits into the recess of the casing;
   (c) a female locking element formed on the casing sidewall, the female locking element including a bottom wall with a base end secured to the casing side wall and a flexible part secured to the bottom wall, the flexible part terminating in a locking pawl;
   (d) a male locking element formed on the cover sidewall, the male locking element having
      (i) a flexible part to be engaged with the female locking element,
      (ii) a joint portion connecting the flexible part to the cover side wall,
      (iii) first and second locking holes formed on the flexible part and spaced apart from each other by a spacing equal to the thickness of the packing; and
   (e) wherein, when the packing is not interposed between the recess portion of said cover and the end edge of the casing side wall, the end edge of the casing side wall is fitted into the recess portion of the cover and the first locking hole of the cover is engaged by the locking pawl of the casing a front end of the flexible part abutting against the bottom wall of the female locking member, and when the packing is interposed between the recess portion of the cover and the end edge of the casing side wall, the second locking hole of the cover is engaged by the locking pawl of the casing and the front end of the flexible part being spaced from the bottom wall.

2. The electrical connection box as claimed in claim 1, wherein said male locking element having three or more locking holes for receiving a plurality of packing, each said packing having various thickness.

3. An electrical connection box capable of being sealed through the use of an elongated watertight packing of a predefined thickness, the electrical connection box comprising:
   (a) a casing having a casing sidewall of a predetermined thickness with the sidewall terminating in an end edge;
   (b) a cover including a cover sidewall for placing on the casing, the cover having a recess about the periphery of the casing, the recess having a width corresponding to the thickness of the end edge of the casing side wall, the casing and cover normally being engaged and locked with each other so that the end edge of the sidewall fits into the recess of the casing;
   (c) a female locking element formed on the casing sidewall, the female locking element being formed in a rectangular hollow portion and including first and second locking pawls formed in said female locking element on an inner wall opposed to the side wall of the casing, the first and second locking pawls being spaced apart from each other by the thickness of the packing;
   (d) a male locking element formed on the cover sidewall, the male locking element having
      (i) a flexible part to be inserted into the interior of the female locking element,
      (ii) a joint portion connecting between the proximal end of the flexible part and the side wall of the cover,
      (iii) a third locking pawl formed in the distal end of the flexible part and a recess; and
   (e) wherein, when the packing is not interposed between the recess portion of said cover and the top of the side wall of said casing, the top of the side wall of the casing is fitted into the recess portion of the cover and the third locking pawl of the cover is engaged by the first locking pawl of the casing, and when the packing is interposed between the recess portion of the cover and the top of the side wall of the casing, the third locking pawl of the cover is engaged by the second locking pawl of the casing and wherein said female locking element includes at least three or more locking pawls, each said locking pawl for receiving a plurality of packing, each said packing having various thickness.

* * * * *